(12) United States Patent
Liu

(10) Patent No.: US 9,788,065 B2
(45) Date of Patent: Oct. 10, 2017

(54) METHODS AND DEVICES FOR PROVIDING A VIDEO

(71) Applicant: Xiaomi Inc., Beijing (CN)

(72) Inventor: Jie Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/687,195

(22) Filed: Apr. 15, 2015

(65) Prior Publication Data

US 2016/0057475 A1     Feb. 25, 2016

Related U.S. Application Data

(63) Continuation of application No. PCT/CN2015/071274, filed on Jan. 22, 2015.

(30) Foreign Application Priority Data

Aug. 20, 2014  (CN) .......................... 2014 1 0412559

(51) Int. Cl.
  *H04N 5/445*     (2011.01)
  *H04N 21/4788*   (2011.01)
  (Continued)

(52) U.S. Cl.
  CPC ... *H04N 21/4788* (2013.01); *H04N 21/23418* (2013.01); *H04N 21/25841* (2013.01); *H04N 21/25875* (2013.01); *H04N 21/2187* (2013.01)

(58) Field of Classification Search
  CPC ................................................ H04N 21/2187
  (Continued)

(56) References Cited

U.S. PATENT DOCUMENTS

| 8,484,381 B2 | 7/2013 | Fraley |
| 2003/0169285 A1* | 9/2003 | Smith .................... H04N 7/181 715/716 |

(Continued)

FOREIGN PATENT DOCUMENTS

| CN | 101360118 | 2/2009 |
| CN | 101626481 | 1/2010 |

(Continued)

OTHER PUBLICATIONS

Extended European Search Report from European Patent Office for European application No. 15181477.9, dated Oct. 20, 2015, 8 pages.

(Continued)

*Primary Examiner* — Michael Hong
(74) *Attorney, Agent, or Firm* — Finnegan, Henderson, Farabow, Garrett & Dunner LLP

(57) ABSTRACT

A method for providing a video is provided. The method includes: receiving in real time a video frame sent from a first terminal device, the video frame including a frame identifier and information of a first user account; storing the video frame in a video file corresponding to the first user account based on the frame identifier; determining content summary information of the video file; sending the content summary information to a second terminal device corresponding to a second user account, the second user account being associated with the first user account; receiving a video request from the second terminal device; and sending the video file to the second terminal device.

18 Claims, 8 Drawing Sheets

(51) Int. Cl.
*H04N 21/234* (2011.01)
*H04N 21/258* (2011.01)
*H04N 21/2187* (2011.01)

(58) Field of Classification Search
USPC .......................................................... 725/41
See application file for complete search history.

(56) References Cited

U.S. PATENT DOCUMENTS

| | | | |
|---|---|---|---|
| 2009/0113472 A1* | 4/2009 | Sheth | G06F 17/3089 725/34 |
| 2012/0066355 A1 | 3/2012 | Tiwari et al. | |
| 2012/0213212 A1 | 8/2012 | Moore et al. | |
| 2012/0260298 A1 | 10/2012 | Chen et al. | |
| 2012/0303834 A1 | 11/2012 | Adam et al. | |
| 2013/0073624 A1 | 3/2013 | Nguyen et al. | |
| 2013/0089304 A1 | 4/2013 | Jiang et al. | |
| 2013/0279810 A1* | 10/2013 | Li | G06K 9/00724 382/195 |

FOREIGN PATENT DOCUMENTS

| | | |
|---|---|---|
| CN | 101707686 | 5/2010 |
| CN | 102207966 | 10/2011 |
| CN | 102307295 | 1/2012 |
| CN | 102664943 | 9/2012 |
| CN | 102708120 A | 10/2012 |
| CN | 103209248 | 7/2013 |
| CN | 103259938 | 8/2013 |
| CN | 103596017 | 2/2014 |
| CN | 104219785 | 12/2014 |
| EP | 2720457 A1 | 4/2014 |
| JP | 2006157235 A | 6/2006 |
| JP | 2009278481 | 11/2009 |
| JP | 2013101559 A | 5/2013 |
| JP | 2013229644 A | 11/2013 |
| RU | 90230 U1 | 12/2009 |
| RU | 2011148384 | 6/2013 |
| RU | 2012117759 | 11/2013 |

OTHER PUBLICATIONS

English version of International search report for International application No. PCT/CN2015/071274, mailed May 27, 2015, 2 pages.

Communication from European Patent Office for European application No. 15181477.9, dated Sep. 16, 2016, 8 pages.

Russian Report on Examination Results from Russian Federal Service for Application No. 2015111152/07, dated Jun. 23, 2016, 30 pages.

Martha Larson et al: "Automatic Tagging and Geotagging in Video collections and Communities," Proceedings of the 1st ACM International Conference on Multimedia Retrieval, Jan. 1, 2011, 8 pages.

International Search Report of PCT/CN2015/071274, mailed from the State Intellectual Property Office of China on May 27, 2015.

* cited by examiner

METHODS AND DEVICES FOR PROVIDING A VIDEO

CROSS-REFERENCE TO RELATED APPLICATIONS

This application is a continuation of International Application PCT/CN2015/071274, filed Jan. 22, 2015, which is based upon and claims priority to Chinese Patent Application No. 201410412559.5, filed Aug. 20, 2014, the entire contents of all of which are incorporated herein by reference.

TECHNICAL FIELD

The present disclosure generally relates to the field of network technologies and, more particularly, to methods and devices for providing a video.

BACKGROUND

With the rapid development of communication technology and smart devices, users often desire to use a terminal device to share and/or watch a real-time video with others, such as their friends. Existing network bandwidth and servers also provide support for real-time transmission of a video.

In conventional technologies, a communication connection is first established between a first terminal device and a second terminal device through a server, and then a video captured in real time is transmitted by the first terminal device to the second terminal device through the server for sharing the real-time video between users.

SUMMARY

According to a first aspect of the present disclosure, there is provided a method for providing a video, comprising: receiving in real time a video frame sent from a first terminal device, the video frame including a frame identifier and information of a first user account; storing the video frame in a video file corresponding to the first user account based on the frame identifier; determining content summary information of the video file; sending the content summary information to a second terminal device corresponding to a second user account, the second user account being associated with the first user account; receiving a video request from the second terminal device; and sending the video file to the second terminal device.

According to a second aspect of the present disclosure, there is provided a method for providing a video, comprising: receiving content summary information pushed from a server, the content summary information being determined by the server based on a video file corresponding to a first user account, wherein the server acquires the video file based on a video frame sent from a first terminal device in real time; displaying the content summary information; detecting a selection of the content summary information; sending, in response to detecting the selection, a video request to the server for acquiring the video file; and receiving the video file from the server.

According to a third aspect of the present disclosure, there is provided a server, comprising: a processor; and a memory for storing instructions executable by the processor. The processor is configured to: receive in real time a video frame sent from a first terminal device, the video frame including a frame identifier and information of a first user account; store the video frame in a video file corresponding to the first user account based on the frame identifier; determine content summary information of the video file; send the content summary information to a second terminal device corresponding to a second user account, the second user account being associated with the first user account; receive a video request from the second terminal device; and send the video file to the second terminal device.

According to a fourth aspect of the present disclosure, there is provided a terminal device, comprising: a processor; and a memory for storing instructions executable by the processor. The processor is configured to: receive content summary information pushed from a server, the content summary information being determined by the server based on a video file corresponding to a first user account, wherein the server acquires the video file based on a video frame sent from a first terminal device in real time; display the content summary information; detect a selection of the content summary information; send, in response to detecting the selection, a video request to the server for acquiring the video file; and receive the video file.

It is to be understood that both the foregoing general description and the following detailed description are exemplary rather than limiting the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The following exemplary embodiments and description thereof intend to illustrate, rather than to limit, the present disclosure. Hereinafter, the present disclosure will be described with reference to the drawings.

Figure 1:
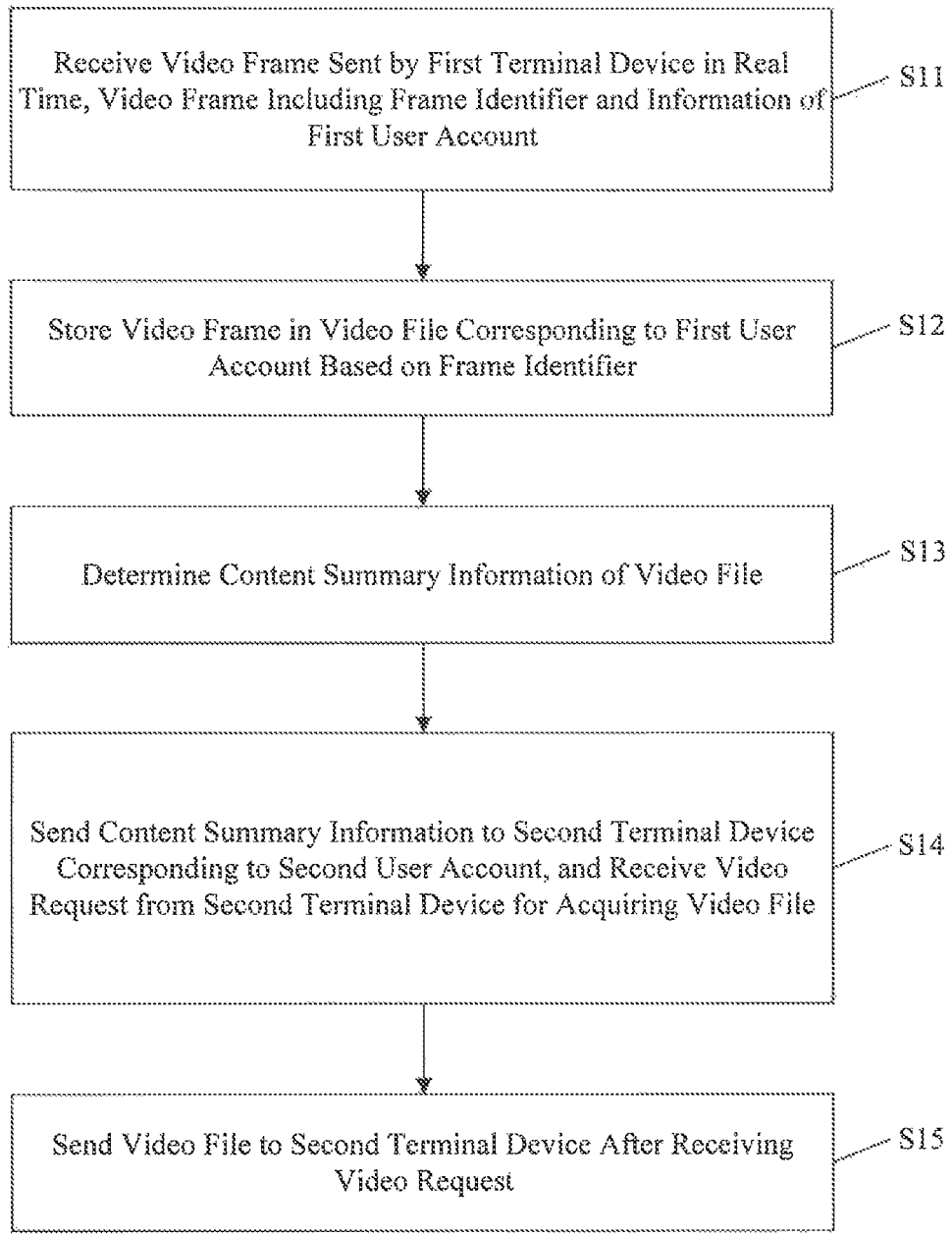
FIG. 1 is a flowchart of a method for providing a video, according to an exemplary embodiment.
Figure 2:
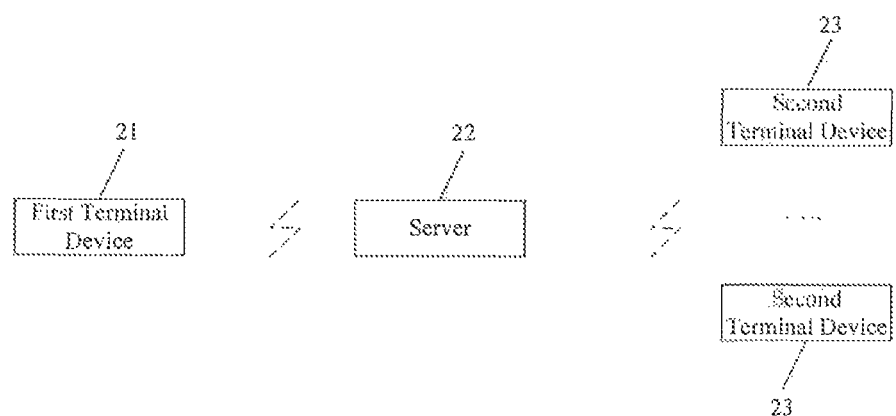
FIG. 2 is a block diagram illustrating a system for providing a video, according to an exemplary embodiment.

FIG. 1 is a flowchart of a method 100 for providing a video, according to an exemplary embodiment. For example, the method 100 may be implemented in a system 200 in FIG. 2. As shown in FIG. 2, the system 200 includes a first terminal device 21, a server 22, and one or more second terminal devices 23. The system 200 may include a plurality of first terminal devices 21 and a plurality of second terminal devices 23, although FIG. 2 shows only one first terminal device 21 and two second terminal devices 23. As illustrated in FIG. 2, the server 22 is connected with the first terminal device 21 and the second terminal devices 23 through a wireless network. In some implementations, these devices may also be connected through a wired network, to which the present disclosure makes no restriction. The first terminal device 21 may upload a video in real time, and the server 22 may store the received video and send content summary information of the video to the second terminal devices 23.

Referring to FIG. 1, the method 100 may be performed by a server, such as the server 22 shown in FIG. 2. The method 100 includes following steps.

In step S11, the server receives a video frame sent by a first terminal device in real time, where the video frame includes a frame identifier and information of a first user account.

For example, a first user may register the first user account on the server in advance, and log onto the server with the first user account when the first user takes a video and shares it in real time using the first terminal device. Then the first terminal device may send to the server each video frame taken in real time, where each video frame includes a corresponding frame identifier and information of the first user account.

A frame identifier may take a variety of forms. For example, the frame identifier may be a serial number of the video frame provided by the first terminal device when capturing the video in the video frame. As another example, the frame identifier may be a time recorded by the first terminal device when capturing the video in the video frame.

In step S12, the server stores the video frame in a video file corresponding to the first user account based on the frame identifier.

In some embodiments, the server may receive video frames sent by a plurality of first terminal devices simultaneously. The server may search for a video file corresponding to the first user account included in the video frame, and then store the video frame in the corresponding video file. For example, if a video file corresponding to the first user account is available, the server may store the video frame in the video file based on a value of the frame identifier. If no video file corresponding to the first user account is available, the server may create a video file corresponding to the first user account and store the video frame in the created video file. For example, if the video frame is a first video frame of the video captured by the first terminal device, the video file corresponding to the first user account may not have been created on the server yet. Consequently, the server may create a video file and store the video frame into the created video file. On the other hand, if the video frame is not the first video frame of the video captured by the first terminal device, the video file corresponding to the first user account may have been created on the server, and the server may store the video frame in the corresponding video file.

In step S13, the server determines content summary information of the video file. The content summary information may describe the main content of the corresponding video file.

The video file corresponding to the first user account may include a plurality of video frames. In some embodiments, the server may extract a first selected feature from each video frame of the video file, acquire an identification result and a corresponding reliability degree using at least one classifier created in advance, and combine the first user account and the identification result with the highest reliability for acquiring the content summary information of the video file.

The first selected feature may be a predetermined feature required by a plurality of classifiers. The classifiers may be created in advance and may include a scene classifier, an event classifier, and/or a face classifier, etc. For example, suppose that a feature to be extracted by the scene classifier is a color histogram feature, a feature to be extracted by the event classifier is a Scale-Invariant Feature Transform (SIFT) feature, and a feature to be extracted for the face classifier is a Local Binary Patterns (LBP) feature, the first selected feature may then include the color histogram feature, the SIFT feature or the LBP feature.

By using at least one classifier, an identification result and a corresponding reliability degree may be obtained based on the extracted first selected feature for each classifier. The server may combine the first user account and the identification result with the highest reliability degree to acquire the content summary information of the video file. The reliability degree may be set as a number between 0 and 1. For example, the scene classifier may produce an identification result A and a reliability degree of 80%. The event classifier may produce an identification result B and a reliability degree of 50%. In the meantime, the face classifier may produce an identification result of an actor C and a reliability degree of 90%. Thus, the content summary information acquired may be set to "the first user account meets with actor C". Other combination methods to acquire the content summary information are also available without departing from the scope of the present disclosure.

In some embodiments, a scene classifier may be created as follows. The server may determine one or more scenes, collect at least a predetermined number of images for each scene, extract a second selected feature from the images, and train the second selected feature for acquiring the scene classifier. The predetermined number of images may include at least one interference image.

The one or more scenes may be determined in advance. For example, in a basketball match, possible scenes may include offensive rebounds, defensive rebounds, assists, fouls, steals and so on. A predetermined number of images may be collected for each scene, and a higher accuracy of the scene classifier may be achieved with an increased number of images collected. The predetermined number of images may include one or more interference images. The second selected feature, such as the color histogram feature, is extracted from the predetermined number of images. A higher accuracy of the created scene classifier may be achieved with more selected features. The scene classifier may be trained and acquired according to the second selected feature.

In some embodiments, an event classifier may be created as follows. The server may determine one or more events, collect at least a predetermined number of videos for each event, extract a third selected feature from the predetermined number of videos, and train and acquire an event classifier according to the third selected feature. The predetermined number of videos may include at least one interference video.

The one or more events may be determined in advance, such as a basketball match, a football match, and filming, etc. A higher accuracy of the created event classifier may be achieved with an increased number of videos collected. A predetermined number of interference videos may be required to be included in the videos. The third selected feature, such as the SIFT feature, is extracted from the predetermined number of videos. A higher accuracy of the created event classifier may be achieved with more selected features. The event classifier may be trained and acquired according to the third selected feature.

In some embodiments, a face classifier may be created as follows. The server may determine one or more persons, collect at least a predetermined number of images for each person, detect a face area from the predetermined number of images, extract a fourth selected feature, and train and acquire a face classifier according to the fourth selected feature.

The one or more persons may be determined in advance. The predetermined number of images is collected for each person, and a higher accuracy of the created face classifier may be achieved with an increased number of collected images. The fourth selected feature, such as the LBP feature, is extracted from the predetermined number of images. A higher accuracy of the created face classifier may be achieved with more selected features. The face classifier may be trained and acquired according to the fourth selected feature.

In some embodiments, the server may receive geographical location information sent by the first terminal device, and may include the geographical location information in the content summary information. For example, the first terminal device may acquire Global Positioning System (GPS) information and send the geographical location information to the server. Suppose that the received geographical location information is D, and the acquired content summary information by using the classifier and the first user account is "the first user account meets with actor C," the server may determine the content summary information to be "the first user account meets with actor/actress C at D" after including the geographical location information.

In some embodiments, the server may determine the content summary information of the video file at a predetermined period, and during the period, the content summary information relating to the video file may remain the same after a video frame is added in the video file. For example, the predetermined period may be set to 5 seconds, 10 seconds and 15 seconds, etc.

The server may determine whether the content summary information in the current period is consistent with prior content summary information determined in a previous period, and proceed to step S14 if the content summary information is not consistent with the prior content summary information. If the content summary information is consistent with the prior content summary information, it may be unnecessary to send the content summary information determined within the current set period to the second terminal device, and thus, the server may omit the execution of step S14. In doing so, the server may avoid repeating sending the same content summary information to the second terminal device.

In step S14, the server sends, e.g., pushes, the content summary information to a second terminal device corresponding to a second user account and subsequently receives a video request from the second terminal device for acquiring the video file. For example, the second terminal device may display the content summary information after receiving content summary information from the server, detect that the content summary information is selected by the second user, and send a video request to the server for acquiring the video file. The second user account may be associated with the first user account.

In some embodiments, the first user account may be associated with a plurality of second user accounts, and different association modes may be set depending on the applications. For example, in a QQ™ application, a plurality of friends may be set for the first user account, and these friends may correspond to the second user accounts. As another example, in a WeChat™ application, a friend network may be set for the first user account, and the user accounts in the friend network may correspond to the second user accounts.

The server may first acquire the second user account associated with the first user account, and then send the determined content summary information to the second terminal device corresponding to the second user account. For example, the server may add the content summary information into a hyperlink and send the hyperlink to the second terminal device. As another example, the server may directly send the content summary information to the second terminal device. After receiving the content summary information, the second terminal device may display the content summary information to the second user. The second terminal device may display the content summary information in different forms, for example, in the form of hyperlinks, or in the form of buttons, based on the form of the content summary information sent by the server.

The second user may ignore the content summary information if the second user decides not to watch the video. Otherwise, the second user may select the content summary information if the second user decides to watch the video. If the second terminal device is connected to peripheral devices such as a mouse, a keyboard or the like, the second user may select the content summary information by means of those peripheral devices. If the second terminal device is provided with a touch screen, the second user may select the content summary information directly by fingers or a stylus.

After detecting a selection of the content summary information, the second terminal device determines that the second user desires to watch the video and sends a video request to the server requesting the server to send the video file.

In step S15, the server sends the video file to the second terminal device after receiving the video request.

In some embodiments, the server may receive a device change message sent by the second terminal device, send the video file to a third terminal device, and indicate to the third terminal device a frame identifier of an initial video frame as a starting position for playing the video. The device change message may indicate a change to the third terminal device for receiving the video file. A user using the second terminal device sometimes may need to switch the terminal device. For example, the user originally is watching a video by using a TV set in a living room, and may need to switch to another terminal device if he goes to the bedroom. In these circumstances, the second terminal device may send a device change message to the server. After receiving the device change message, the server may stop sending the video file to the second terminal device, and start to send the video file to the third terminal device. The server may indicate a frame identifier of an initial video frame to the third terminal device as a starting position for playing the video, thereby allowing the user to continue watching the video and improving user experience.

In the method 100, by providing the content summary information to the second terminal device and sending the video file to the second terminal device after receiving the video request, a communication connection is established between the second terminal device and the first terminal device when the second user desires to watch the video, thereby increasing efficiency of use of network resources and improving user experience.

Figure 3:
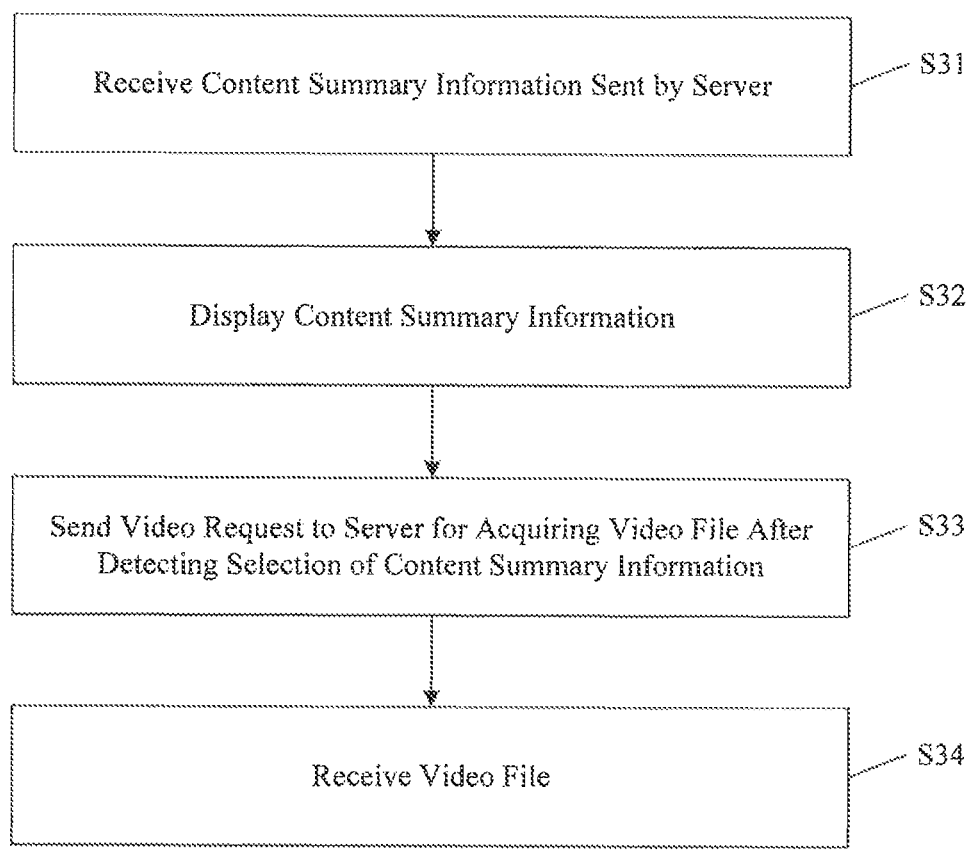
FIG. 3 is a flowchart of a method for providing a video, according to an exemplary embodiment.

FIG. 3 is a flowchart of a method 300 for providing a video, according to an exemplary embodiment. The method 300 may be performed by a terminal device, such as the second terminal device 23 shown in FIG. 2. Referring to FIG. 3, the method 300 includes the following steps.

In step S31, the second terminal device receives content summary information sent, e.g., pushed, from a server. The content summary information is determined by the server according to a video file corresponding to a first user account. The server acquires the video file by receiving in real time a video frame sent by a first terminal device, where the video frame includes a frame identifier and information of the first user account.

In step S32, the second terminal device displays the content summary information.

In step S33, the second terminal device sends a video request to the server for acquiring the video file after detecting a selection of the content summary information.

In step S34, the second terminal device receives the video file.

In some circumstances, a second user using the second terminal device may need to switch over to another terminal device. For example, the second terminal device may receive a device change instruction from the second user, and the device change instruction designates a third terminal device for receiving the video file. The second terminal device may send a device change message to the server, so that the server may send the video file to the third terminal device and designate a frame identifier of a video frame for initial playing.

For example, during playing a video, the second terminal device may provide a device change function. After the second user selects the function, the second terminal device may receive a device change instruction which designates a third terminal device for receiving the video file. The second terminal device may send to the server a device change message which indicates a change to the third terminal device for receiving the video file. After receiving the device change message, the server may send the video file to the third terminal device and indicate to the third terminal device a frame identifier of an initial video frame as a starting position for playing the video file, thereby allowing the second user to continue watching the video and improving user experience.

In some embodiments, after receiving a device change instruction which designates a third terminal device for receiving the video file, the second terminal device may send a stored video file to the third terminal device and indicate to the third terminal device a frame identifier of an initial video frame as a starting position for playing the video file, thereby allowing the second user to continue watching the video.

Figure 4:
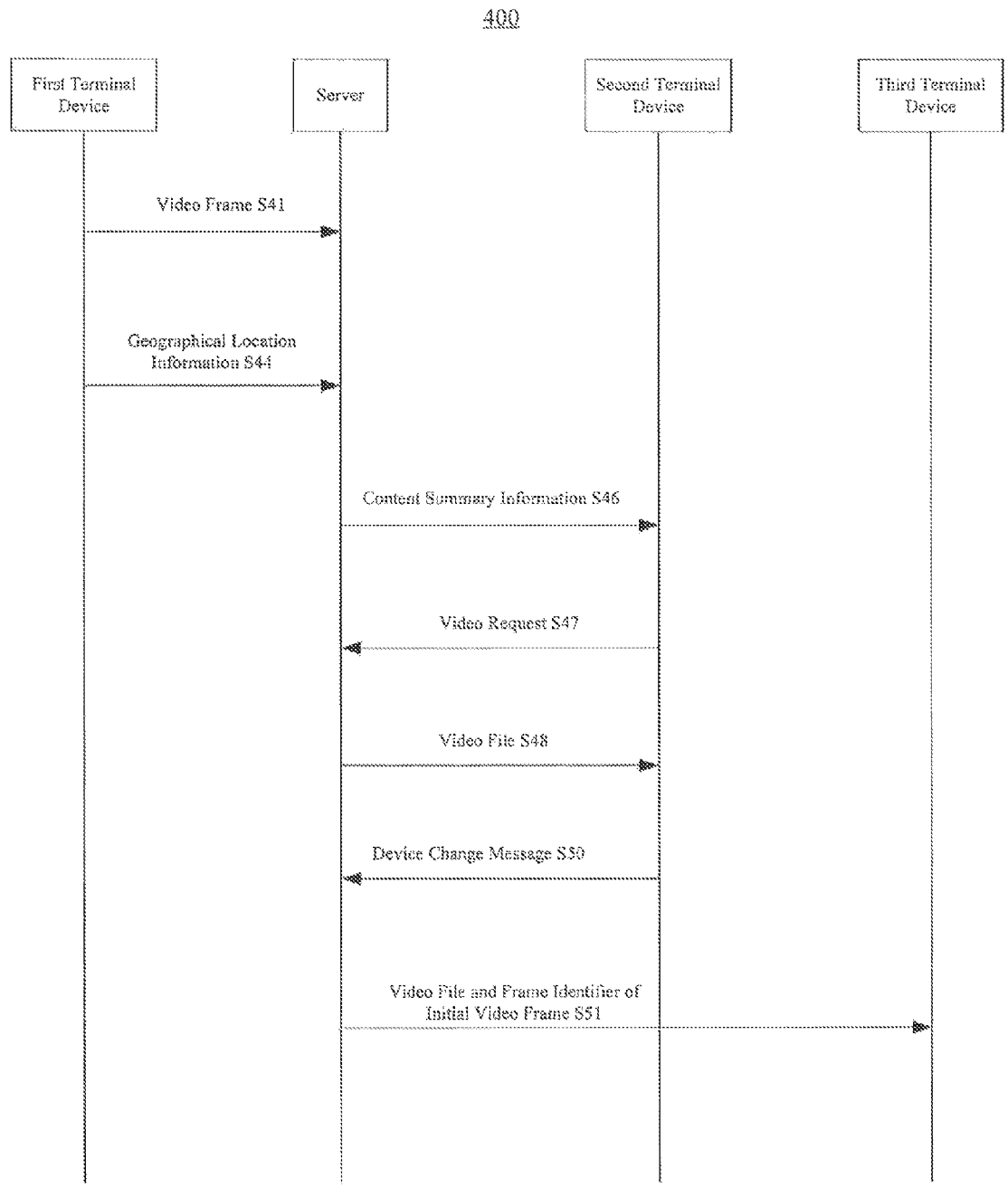
FIG. 4 is a flow diagram of a method for providing a video, according to an exemplary embodiment.

FIG. 4 is a flow diagram of a method 400 for providing a video, according to an exemplary embodiment. The method 400 may be implemented in a system for providing a video, such as the system 200 shown in FIG. 2. Referring to FIG. 4, the method 400 includes the following steps.

In step S41, the first terminal device sends to the server a video frame in real time, where the video frame includes a frame identifier and information of a first user account.

After receiving the video frame, the server searches for a video file corresponding to the first user account, and if the video file corresponding to the first user account is identified, the server stores the video frame in the video file based on a value of the frame identifier. If no video file corresponding to the first user account is identified, the server creates a video file corresponding to the first user account and stores the video frame in the created video file.

At a predetermined period, the server extracts a first selected feature from each video frame of the video file, obtains at least one identification result and a corresponding reliability degree based on the first selected feature by using at least one classifier, and combines the first user account and the identification result with the highest reliability degree for acquiring content summary information of the video file.

In step S44, the first terminal device sends geographical location information to the server.

After receiving the geographical location information sent by the first terminal device, the server includes the geographical location information in the content summary information.

In step S46, if the content summary information is not consistent with prior content summary information determined in a previous period, the server sends, e.g., pushes, the content summary information to a second terminal device corresponding to a second user account, where the second user account is associated with the first user account.

In some embodiments, a plurality of second terminal devices may be configured to receive the video from the server. For simplicity of illustration, a single second terminal device is described with respect to the method 400 in the following description. One of ordinary skill will appreciate that the method 400 may be applied to a plurality of second terminal devices in a substantially similar manner, in which each of the second terminal devices performs the described method with the server individually.

After receiving the content summary information from the server, the second terminal device may display the content summary information and detect a selection of the content summary information by the second user of the second terminal device. In step S47, the second terminal device sends a video request to the server for acquiring the video file.

In step S48, the server sends the video file to the second terminal device after receiving the video request.

The second terminal device displays the video file after receiving it from the server.

The second terminal device may subsequently receive a device change instruction from the second user, and the device change instruction may designate a third terminal device for receiving the video file. In step S50, the second terminal device sends a device change message to the server, which indicates a change to the third terminal device for receiving the video file.

After receiving the device change message sent by the second terminal device, in step S51, the server sends the video file to the third terminal device and indicates to the third terminal device a frame identifier of an initial video frame as a starting position to play the video file.

After receiving the video file, the third terminal device starts playing the video file from the video frame corresponding to the indicated frame identifier.

By providing content summary information to the second terminal device and sending the video file after receiving the video request from the second terminal device, a communication connection between the second terminal device and the first terminal device is established when the second user desires to watch the video, thereby increasing efficiency of network resources usage and improving user experience.

Figure 5:
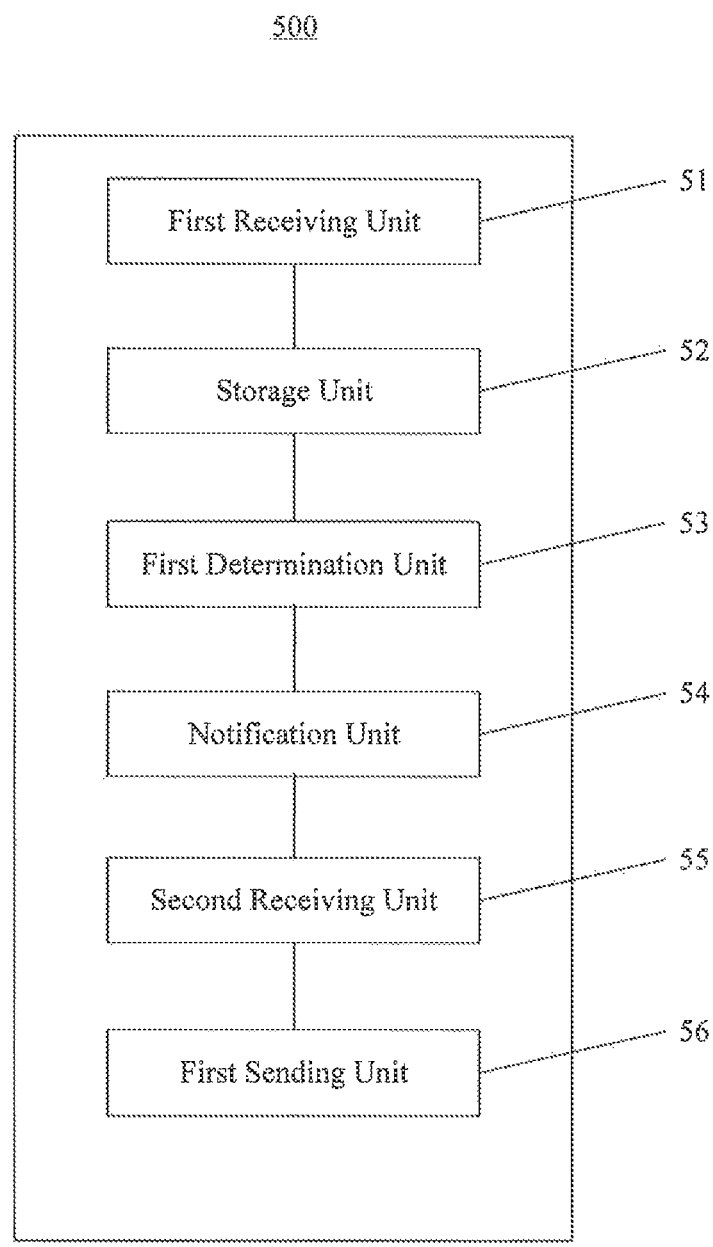
FIG. 5 is a block diagram of a device for providing a video, according to an exemplary embodiment.

FIG. 5 is a block diagram of a device 500 for providing a video, according to an exemplary embodiment. As shown in FIG. 5, the device 500 includes a first receiving unit 51, a storage unit 52, a first determination unit 53, a notification unit 54, a second receiving unit 55 and a first sending unit 56.

The first receiving unit 51 is configured to receive a video frame sent by a first terminal device in real time. The video frame includes a frame identifier and information of a first user account.

The storage unit 52 is configured to store the video frame in a video file corresponding to the first user account based on the frame identifier.

The first determination unit 53 is configured to determine content summary information of the video file.

The notification unit 54 is configured to send the content summary information to a second terminal device corresponding to a second user account. The second user account is associated with the first user account. After receiving the content summary information, the second terminal device displays the content summary information to the second user, and after detecting a selection of the content summary information, sends a video request to a server for acquiring the video file.

The second receiving unit 55 is configured to receive the video request.

The first sending unit 56 is configured to send the video file to the second terminal device.

In some embodiments, the storage unit 52 may include a search subunit and a storage subunit.

The search subunit is configured to search for a video file corresponding to the first user account.

The storage subunit is configured to store the video frame in the video file according to a value of the frame identifier, if the video file corresponding to the first user account is identified. If no video file corresponding to the first user account is identified, the storage subunit is configured to create a video file corresponding to the first user account and store the video frame in the created video file.

In some embodiments, the first determination unit 53 may include an extraction subunit, an identification subunit, and a combination subunit.

The extraction subunit is configured to extract a first selected feature from each video frame of the video file.

The identification subunit is configured to obtain at least one identification result and a corresponding reliability degree based on the extracted first selected feature by using at least one classifier.

The combination subunit is configured to combine the first user account and the identification result with the highest reliability degree for acquiring the content summary information of the video file.

In some embodiments, the device 500 may also include a second determination unit, a first collecting unit, a first extracting unit, and a first training unit.

The second determination unit is configured to determine one or more scenes for acquiring a scene classifier.

The first collecting unit is configured to collect at least a predetermined number of images for each scene. The predetermined number of images may include a predetermined number of interference images.

The first extracting unit is configured to extract a second selected feature from the predetermined number of images.

The first training unit is configured to train and acquire a scene classifier according to the second selected feature.

In some embodiments, the device 500 may also include a third determination unit, a second collecting unit, a second extracting unit, and a second training unit.

The third determination unit is configured to determine one or more events for acquiring an event classifier.

The second collecting unit is configured to collect at least a predetermined number of videos for each event, and the predetermined number of videos may include a predetermined number of interference videos.

The second extracting unit is configured to extract a third selected feature from the predetermined number of videos.

The second training unit is configured to train and acquire an event classifier according to the third selected feature.

In some embodiments, the device 500 may also include a fourth determination unit, a third collecting unit, a third extracting unit, and a third training unit.

The fourth determination unit is configured to determine one or more persons for acquiring a face classifier.

The third collecting unit is configured to collect at least a predetermined number of images for each person.

The third extracting unit is configured to detect a face area from the predetermined number of images and extract a fourth selected feature.

The third training unit is configured to train and acquire a face classifier according to the fourth selected feature.

In some embodiments, the device 500 may also include a third receiving unit and an attaching unit.

The third receiving unit is configured to receive geographical location information sent by the first terminal device.

The attaching unit is configured to attach the geographical location information to the content summary information.

In some embodiments, the first determination unit 53 may include a determination subunit. The determination subunit is configured to determine the content summary information of the video file at a predetermined period, and determine whether the content summary information is consistent with prior content summary information determined in a previous period. If the content summary information is not consistent with the prior content summary information determined in the previous period, the notification unit 54 may proceed to send the content summary information to the second terminal device.

In some embodiments, the device 500 may also include a fourth receiving unit and a second sending unit.

The fourth receiving unit is configured to receive a device change message sent by the second terminal device, where the device change message designates a third terminal device for receiving the video file.

The second sending unit is configured to send the video file to the third terminal device and indicate to the third terminal device a frame identifier of an initial video frame as a starting position for playing the video file.

Figure 6:
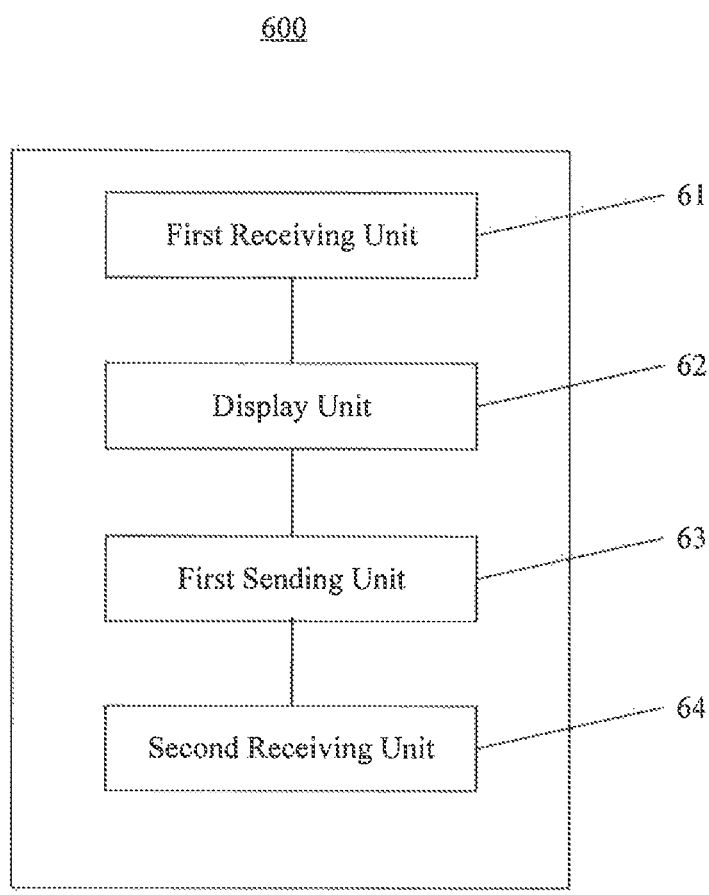
FIG. 6 is a block diagram of a device for providing a video, according to an exemplary embodiment.

FIG. 6 is a block diagram of a device 600 for providing a video, according to an exemplary embodiment. As shown in FIG. 6, the device 600 includes a first receiving unit 61, a display unit 62, a first sending unit 63, and a second receiving unit 64.

The first receiving unit 61 is configured to receive content summary information sent by a server, where the content summary information is determined by the server according to a video file corresponding to a first user account, and the video file is acquired by the server in real time based on video frames sent by a first terminal device.

The display unit 62 is configured to display the content summary information.

The first sending unit 63 is configured to send a video request to the server for acquiring the video file after detecting that the content summary information is selected by a user.

The second receiving unit 64 is configured to receive the video file.

In some embodiments, the device 600 may also include a third receiving unit and a second sending unit.

The third receiving unit is configured to receive a device change instruction from the user, which designates a third terminal device for receiving the video file.

The second sending unit is configured to send a device change message to the server, where the device change message indicates to the server a change to the third terminal device for receiving the video file.

Figure 7:
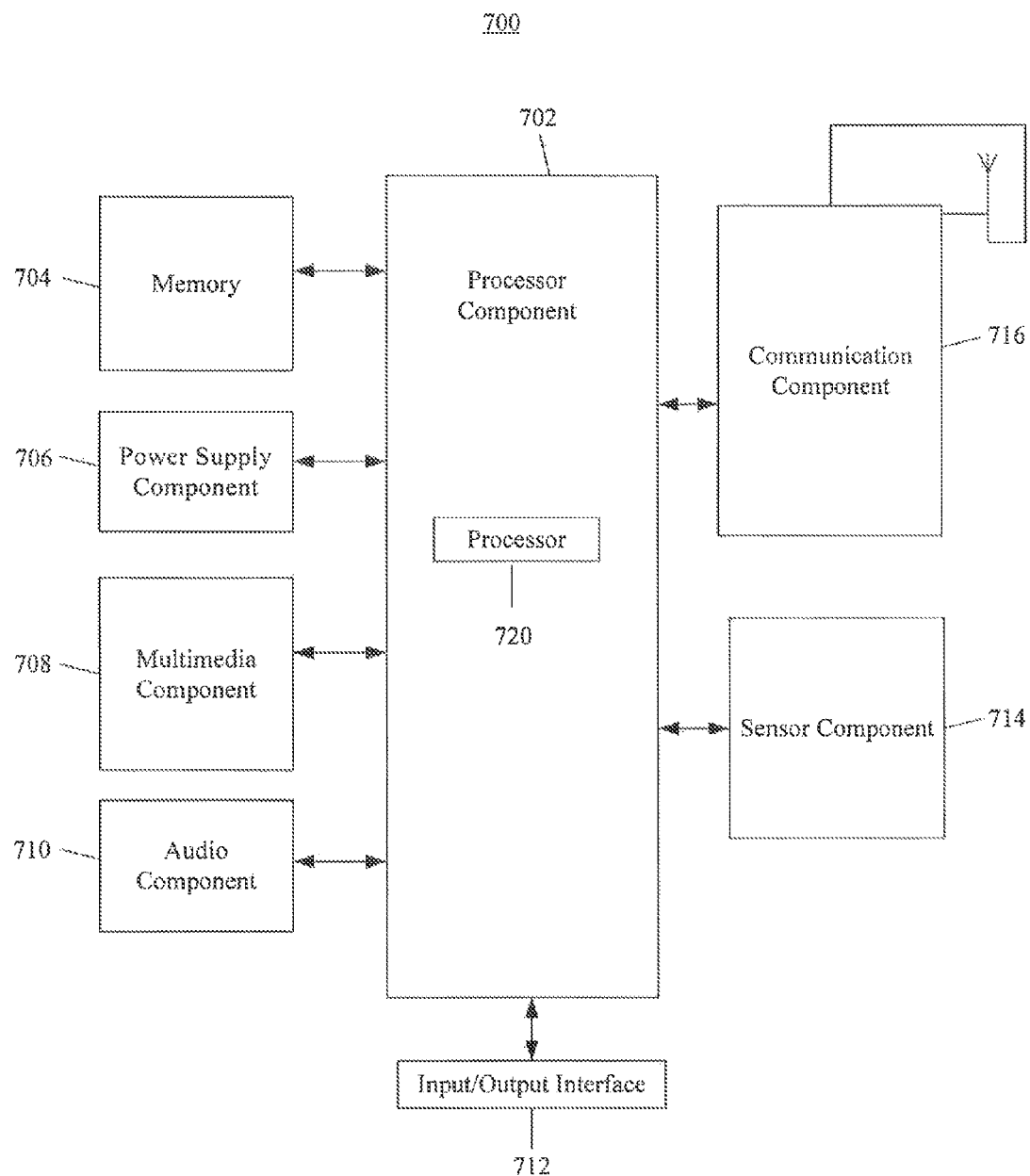
FIG. 7 is a block diagram of a terminal device, according to an exemplary embodiment.

FIG. 7 is a block diagram of a terminal device 700 for providing a video, according to an exemplary embodiment. For example, the terminal device 700 may be a mobile telephone, a computer, a digital broadcasting terminal, a message transceiver device, a games console, a tablet device, a medical device, a fitness facility, a personal digital assistant (PDA) and the like.

Referring to FIG. 7, the terminal device 700 may include one or a plurality of components as below: a processor component 702, a memory 704, a power supply component 706, a multimedia component 708, an audio component 710, an input/output (I/O) interface 712, a sensor component 714 and a communication component 716. The person skilled in the art should appreciate that the structure of the terminal device 700 as shown in FIG. 7 does not intend to limit the terminal device 700. The terminal device 700 may include more or less components or combine some components or other different components.

The processor component 702 generally controls the overall operation of the terminal device 700, such as display, telephone call, data communication, and operation associated with camera operation and record operation. The processor component 702 may include one or a plurality of processors 720 for executing instructions so as to complete steps of above method in part or in whole. In addition, the processor component 702 may include one or a plurality of modules for purpose of interaction between the processor component 702 and other components. For example, the processor component 702 may include a multimedia module for purpose of interaction between the multimedia component 708 and the processor component 702.

The memory 704 is configured to store various types of data so as to support the operation of the terminal device 700. Examples of the data include any application program or approach for operation on the terminal device 700, including contact data, phonebook data, message, picture and video, etc. The memory 704 is also configured to store programs and modules. The processor component 702 performs various functions and data processing by operating programs and modules stored in the memory 704. The memory 704 may be implemented by any type of volatile or non-volatile memory device or combination thereof, such as static random access memory (SRAM), electrically erasable programmable read-only memory (EEPROM), erasable programmable read only memory (EPROM), programmable read-only memory (PROM), read-only memory (ROM), magnetic memory, flash memory, magnetic disk or optical disk.

The power supply component 706 is configured to provide power for various components of the terminal device 700. The power supply component 706 may include a power management system, one or a plurality of power supplies, and other components associated with generation, management and distribution of power for the terminal device 700.

The multimedia component 708 includes a screen between the terminal device 700 and a user and for providing an output interface. In some embodiments, the screen may include a liquid crystal display (LCD) and/or a touch panel (TP). If the screen includes a touch panel, the screen may be implemented as a touch screen for receiving input signal from users. The touch panel includes one or a plurality of touch sensors for sensing of touching, sliding and gestures on the touch panel. The touch sensor not only can sensor trip boundary of touching or sliding, but also can detect the duration and pressure related to the touching or sliding operation. In some embodiments, the multimedia component 708 includes a front-facing camera and/or a rear-facing camera. When the terminal device 700 is under an operation mode, such as capture mode or video mode, the front-facing camera and/or the rear-facing camera may receive external multimedia data. Each of the front-facing camera and the rear-facing camera may be a fixed optical lens system or may have focal length and optical zoom capacities.

The audio component 710 is configured to output and/or input audio signals. For example, the audio component 710 includes a microphone configured to receive an external audio signal when the terminal device 700 is under an operation mode such as a call mode, a record mode and a speech recognition mode. The audio signal received may be further stored in the memory 704 or sent out by the communication component 716. In some embodiments, the audio component 710 also includes a loudspeaker for outputting audio signals.

The I/O interface 712 provides interface between the processor component 702 and peripheral interface modules, the peripheral interface modules may be a keyboard, a click wheel or buttons, etc. These buttons may include but not limited to: home button, volume button, start button and locking button.

The sensor component 714 includes one or more sensors for providing the terminal device 700 with state evaluation from all aspects. For example, the sensor component 714 may detect the on/off state of the terminal device 700, relative positioning of components, for example, the components include the display and keypads of the terminal device 700; the sensor component 714 may also detect the position change of the terminal device 700 or a component thereof, the presence or absence of users' touch on the terminal device 700, the direction or acceleration/deceleration of the terminal device 700, and temperature variation of the terminal device 700. The sensor component 714 may also include a proximity detector, which is configured to detect the presence of nearby objects without physical touch. The sensor component 714 may also include an optical sensor, such as CMOS or CCD image sensor for imaging application. In some embodiments, the sensor component 714 may also include an acceleration sensor, a gyro sensor, a magnetic sensor, a pressure sensor, or a temperature sensor.

The communication component 716 is configured to facilitate wired communication or wireless communication between the terminal device 700 and other equipment. The terminal device 700 is available for access to wireless network based on communication standards, such as WiFi, 2G or 3G, or combination thereof. In an exemplary embodiment, the communication component 716 receives by means of a broadcast channel the broadcast signal or information from external broadcast management systems. In an exemplary embodiment, the communication component 716 also includes a near field communication (NFC) module for performing short-range communication. For example, the NFC module may be implemented on the basis of Radio Frequency Identification (RFID) technology, Infrared Data Association (IrDA) technology, Ultra-wide Bandwidth (UWB) technology, Bluetooth (BT) technology and other technologies.

In exemplary embodiments, the terminal device 700 may be implemented by one or a plurality of application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components, for performing the above described methods.

In exemplary embodiments, there is also provided a non-transitory computer-readable storage medium including instructions, such as included in the memory 704, executable by the processors 720 of the terminal device 700, for performing the above-described methods. For example, the non-transitory computer-readable storage medium may be a read-only memory (ROM), a random access memory (RAM), a CD-ROM, a magnetic tape, a floppy disk and an optical data storage device, etc.

Figure 8:
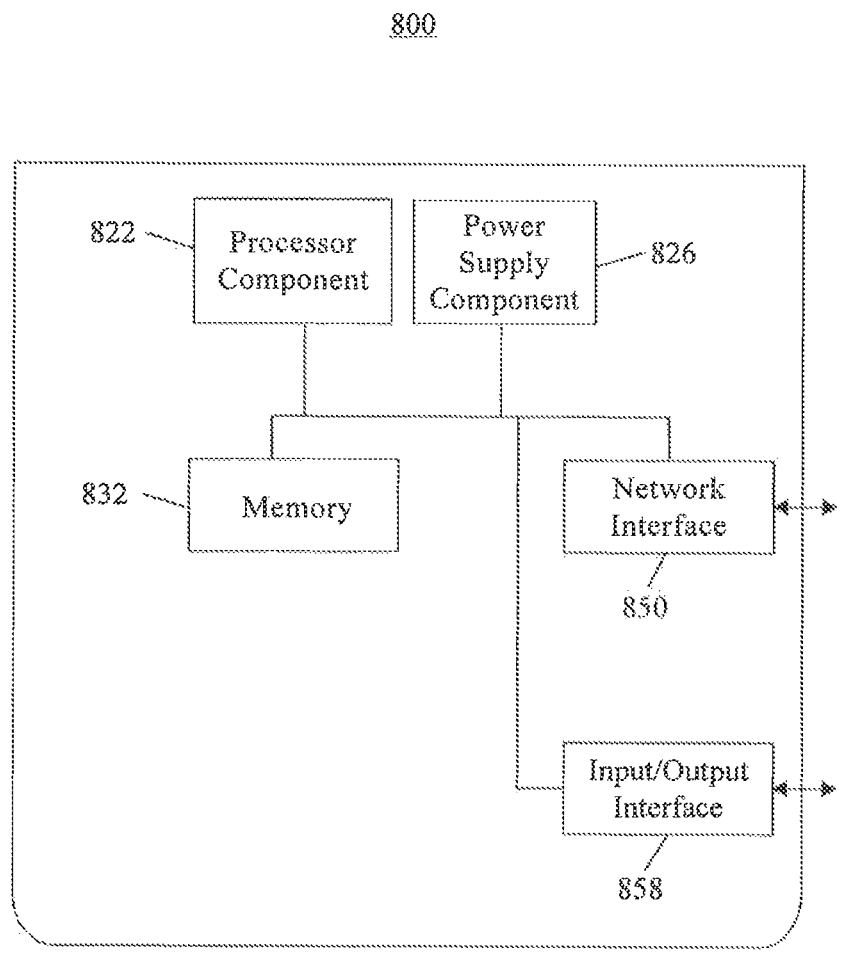
FIG. 8 is a block diagram of a server, according to an exemplary embodiment.

FIG. 8 is a block diagram of a device 800 for providing a video, according to an exemplary embodiment. For example, the device 800 may be provided as a server to perform the above described methods. Referring to FIG. 8, the device 800 includes a processor component 822 that further includes one or more processors, and memory resource represented by the memory 832 for storing instructions executable by the processor component 822, such as application programs. The application programs stored in the memory 832 may include one or more modules each corresponding to a set of instructions.

The device 800 may also include a power supply component 826 configured to perform power management of the device 800, a wired or wireless network interface 850 configured to connect the device 800 to a network, and an input/output (I/O) interface 858. The device 800 may operate based on an operating system stored in the memory 832, for example, Windows Server™, Mac OS X™, Unix™, Linux™, FreeBSD™ or the like.

It should be understood by those skilled in the art that the above described methods, devices, and units can each be implemented through hardware, or software, or a combination of hardware and software. One of ordinary skill in the art will also understand that multiple ones of the above described units may be combined as one unit, and each of the above described units may be further divided into a plurality of sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It should be understood that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for providing a video, comprising:
receiving in real time a video frame sent from a first terminal device, the video frame including a frame identifier and information of a first user account;
storing the video frame in a video file corresponding to the first user account based on the frame identifier;
determining content summary information of the video file;
prior to receiving a video request from a second terminal device, sending the content summary information to the second terminal device corresponding to a second user account, the second user account being associated with the first user account;
receiving the video request from the second terminal device, wherein the second terminal device sends the video request in response to detecting a selection of the content summary information by a user;
sending the video file to the second terminal device;
receiving a device change message sent from the second terminal device, the device change message indicating a change to a third terminal device for receiving the video file; and
sending the video file to the third terminal device and indicating to the third terminal device a frame identifier of an initial video frame as a starting position for playing the video file.

2. The method of claim 1, wherein storing the video frame in a video file comprises:
searching for the video file corresponding to the first user account;
if the video file corresponding to the first user account is identified, storing the video frame in the video file according to a value of the frame identifier; and
if the video file corresponding to the first user account is not identified, creating the video file corresponding to the first user account and storing the video frame in the created video file.

3. The method of claim 1, wherein determining content summary information of the video file comprises:
extracting a first selected feature from at least one video frame of the video file;
obtaining at least one identification result and a corresponding reliability degree based on the extracted first selected feature by using at least one classifier; and
combining the first user account and an identification result corresponding to a highest reliability degree to acquire the content summary information of the video file.

4. The method of claim 1, further comprising:
receiving geographical location information sent from the first terminal device; and
determining the content summary information to include the geographical location information before sending the content summary information to the second terminal device.

5. The method of claim 1, further comprising:
determining current content summary information of the video file at a predetermined period;
determining whether the current content summary information is consistent with prior content summary information determined in a previous period; and
if the current content summary information is not consistent with the prior content summary information, sending the current content summary information to the second terminal device.

6. The method of claim 3, further comprising:
determining one or more scenes for acquiring a scene classifier;
collecting at least a predetermined number of images for each of the one or more scenes, the predetermined number of images including at least one interference image;
extracting a second selected feature from the predetermined number of images; and
training and acquiring the scene classifier according to the second selected feature.

7. The method of claim 3, further comprising:
determining one or more events for acquiring an event classifier;
collecting at least a predetermined number of videos for each of the one or more events, the predetermined number of videos including at least one interference video;
extracting a third selected feature from the predetermined number of videos; and
training and acquiring the event classifier according to the third selected feature.

8. The method of claim 3, further comprising:
determining one or more persons for acquiring a face classifier;
collecting at least a predetermined number of images for each of the one or more persons;
detecting a face area from the predetermined number of images and extracting a fourth selected feature; and
training and acquiring the face classifier according to the fourth selected feature.

9. A method for providing a video, comprising:
prior to sending a video request to a server, receiving content summary information pushed from the server, the content summary information being determined by the server based on a video file corresponding to a first user account, wherein the server acquires the video file based on a video frame sent from a first terminal device in real time and sends the content summary information to a second terminal device corresponding to a second user account, the second user account being associated with the first user account;
displaying the content summary information;
detecting a selection of the content summary information;
sending, in response to detecting the selection of the content summary information, the video request to the server for acquiring the video file;
receiving the video file from the server;
receiving a device change instruction from a user of the second terminal device, the device change instruction designating a third terminal device for receiving the video file; and
sending a device change message to the server, the device change message indicating a change to the third terminal device for receiving the video file, wherein the server sends the video file to the third terminal device and indicates to the third terminal device a frame identifier of an initial video frame as a starting position for playing the video file.

10. A server, comprising:
a processor; and
a memory for storing instructions executable by the processor;
wherein the processor is configured to:
receive in real time a video frame sent from a first terminal device, the video frame including a frame identifier and information of a first user account;
store the video frame in a video file corresponding to the first user account based on the frame identifier;
determine content summary information of the video file;
prior to receiving a video request from a second terminal device, send the content summary information to the second terminal device corresponding to a second user account, the second user account being associated with the first user account;
receive the video request from the second terminal device, wherein the second terminal device sends the video request in response to detecting a selection of the content summary information by a user;
send the video file to the second terminal device;
receive a device change message sent from the second terminal device, the device change message indicating a change to a third terminal device for receiving the video file; and
send the video file to the third terminal device and indicating to the third terminal device a frame identifier of an initial video frame as a starting position for playing the video file.

11. The server of claim 10, wherein the processor is further configured to:
search for the video file corresponding to the first user account;
if the video file corresponding to the first user account is identified, store the video frame in the video file according to a value of the frame identifier; and
if the video file corresponding to the first user account is not identified, create the video file corresponding to the first user account and store the video frame in the created video file.

12. The server of claim 10, wherein the processor is further configured to:
extract a first selected feature from at least one video frame of the video file;
obtain at least one identification result and a corresponding reliability degree based on the extracted first selected feature by using at least one classifier; and
combine the first user account and an identification result corresponding to a highest reliability degree to acquire the content summary information of the video file.

13. The server of claim 10, wherein the processor is further configured to:
receive geographical location information sent from the first terminal device; and
determine the content summary information to include the geographical location information before sending the content summary information to the second terminal device.

14. The server of claim 10, wherein the processor is further configured to:
determine current content summary information of the video file at a predetermined period;
determine whether the current content summary information is consistent with prior content summary information determined in a previous period; and
if the current content summary information is not consistent with the prior content summary information, send the current content summary information to the second terminal device.

15. The server of claim 12, wherein the processor is further configured to:
- determine one or more scenes for acquiring a scene classifier;
- collect at least a predetermined number of images for each of the one or more scenes, the predetermined number of images including at least one interference image;
- extract a second selected feature from the predetermined number of images; and
- train and acquire the scene classifier according to the second selected feature.

16. The server of claim 12, wherein the processor is further configured to:
- determine one or more events for acquiring an event classifier;
- collect at least a predetermined number of videos for each of the one or more events, the predetermined number of videos including at least one interference video;
- extract a third selected feature from the predetermined number of videos; and
- train and acquire the event classifier according to the third selected feature.

17. The server of claim 12, wherein the processor is further configured to:
- determine one or more persons for acquiring a face classifier;
- collect at least a predetermined number of images for each of the one or more persons;
- detect a face area from the predetermined number of images and extract a fourth selected feature; and
- train and acquire the face classifier according to the fourth selected feature.

18. A second terminal device, comprising:
- a processor; and
- a memory for storing instructions executable by the processor;
- wherein the processor is configured to:
- prior to sending a video request to a server, receive content summary information pushed from the server, the content summary information being determined by the server based on a video file corresponding to a first user account, wherein the server acquires the video file based on a video frame sent from a first terminal device in real time, and wherein the second terminal device corresponds to a second user account associated with the first user account;
- display the content summary information;
- detect a selection of the content summary information;
- send, in response to detecting the selection of the content summary information, the video request to the server for acquiring the video file;
- receive the video file;
- receive a device change instruction from a user of the second terminal device, the device change instruction designating a third terminal device for receiving the video file; and
- send a device change message to the server, the device change message indicating a change to the third terminal device for receiving the video file, wherein the server sends the video file to the third terminal device and indicates to the third terminal device a frame identifier of an initial video frame as a starting position for playing the video file.

* * * * *